United States Patent [19]

Jones et al.

[11] 4,003,984

[45] Jan. 18, 1977

[54] PRODUCTION OF SULFURYL FLUORIDE

[75] Inventors: Edward Stephen Jones, Williamsville; Martin Alvin Robinson, East Amherst; Richard Elmer Eibeck, Orchard Park, all of N.Y.

[73] Assignee: Allied Chemical Corporation, Morris Township, N.J.

[22] Filed: Oct. 2, 1975

[21] Appl. No.: 619,103

[52] U.S. Cl. .............................. 423/468; 423/466; 423/467; 423/481
[51] Int. Cl.$^2$ ......................................... C01B 17/45
[58] Field of Search ......................... 423/466–468, 423/481

[56] References Cited

UNITED STATES PATENTS

| | | |
|---|---|---|
| 2,562,432 | 7/1951 | McMann et al. ............... 423/467 X |
| 3,320,030 | 5/1967 | Bisignani et al. .................. 423/466 |
| 3,403,144 | 9/1968 | Lam et al. .......................... 423/468 |
| 3,714,336 | 1/1973 | Davis et al. ........................ 423/468 |
| 3,850,542 | 11/1974 | Barnard et al. .................... 423/468 |

*Primary Examiner*—Edward Stern
*Attorney, Agent, or Firm*—Anthony J. Stewart; Jay P. Friedenson

[57] ABSTRACT

Sulfuryl fluoride is produced by reacting a gaseous mixture of chlorine, sulfur dioxide and hydrogen fluoride, at a temperature between about 125° and 400° C in the presence of a catalytic amount of an alkaline earth metal fluoride.

9 Claims, No Drawings

PRODUCTION OF SULFURYL FLUORIDE

BACKGROUND OF THE INVENTION

This invention relates to a process for producing sulfuryl fluoride, $SO_2F_2$, a known compound having utility as a fumigant.

The most common method heretofore employed for the commercial production of sulfuryl fluoride has involved the gas phase reaction of sulfur dioxide, chlorine, and hydrogen fluoride in the presence of activated carbon which may or may not be impregnated with an alkali metal bifluoride. Note for example U.S. Pat. Nos. 3,092,458 and 3,320,030. The reaction proceeds as follows:

$$SO_2 + Cl_2 + 2HF \rightarrow SO_2F_2 + 2HCl$$

While satisfactory yields have been achieved with such a process, one major disadvantage lies in the inability to economically and efficiently regenerate the activated carbon catalyst when used alone, or when impregnated with an alkali metal bifluoride. Thus the effective life of such catalyst is limited and when such catalysts cease to exhibit sufficient catalytic activity, they must be discarded and replaced by new material. The catalyst poisoning, or reduction of its catalytic effect, becomes particularly severe at higher temperatures, i.e., 250° C to 350° C, resulting in shorter catalyst life and greater amounts of catalyst which must be discarded within a given time.

It is the object of this invention to provide a catalytic process for producing sulfuryl fluoride.

It is a further object of this invention to provide a process for the gas phase production of sulfuryl fluoride in the presence of a regenerable catalyst.

It is a still further object of this invention to provide a process for the gas phase production of sulfuryl fluoride which may be carried out at temperatures lower than previously thought to be necessary.

These and other objects will become apparent from the description which follows:

BRIEF DESCRIPTION OF THE INVENTION

In accordance with this invention there is provided a process for producing sulfuryl fluoride which comprises introducing a gaseous mixture of chlorine, sulfur dioxide, and hydrogen fluoride into a reaction zone in which there is present an alkaline earth metal fluoride catalyst, maintaining the temperature in the reaction zone between about 125° C and about 400° C, and recovering sulfuryl fluoride thus produced.

By "alkaline earth metal" is meant those metals of Group II of the Periodic Table, specifically, calcium, barium, magnesium and strontium. The preferred catalyst is barium fluoride. The catalyst may be used alone or may be present on a carrier such as activated carbon, a fluorinated alumina, or the like. The most preferred catalyst is barium fluoride impregnated onto activated carbon. When the catalytic activity of these catalysts decreases, they may be regenerated by treatment with hydrogen fluoride for reuse in the process. When the alkaline earth metal fluoride is impregnated onto an activated carbon carrier, the reaction may economically and efficiently be carried out at temperatures from about 140° C to about 190° C.

DETAILED DESCRIPTION OF THE INVENTION

In the practice of this invention, a substantially anhydrous gaseous mixture of sulfur dioxide, chlorine and hydrogen fluoride is introduced into a reaction zone containing an alkaline earth metal fluoride catalyst. The temperature of the reaction zone is maintained high enough to effect significant reaction, although very high temperatures should be avoided if possible due to energy requirements and shorter catalyst life. It has also been found that higher temperatures do not always result in improved yield. The reaction products are discharged from the reaction zone and sulfuryl fluoride is recovered therefrom.

In nearly all cases, a by-product of the reaction is sulfuryl chlorofluoride, $SO_2ClF$. However, in view of the differences in the boiling points of $SO_2F_2$ (−57° C) and $SO_2ClF$ (7° C), the sulfuryl fluoride product is easily recovered by known separation means, and the sulfuryl chlorofluoride may be recycled to the feed reaction mixture.

The catalyst may be present in the reaction zone in any form which will provide for sufficient contact with the reactant gases. Tablets or granules are preferred although other forms may be employed. The amount of catalyst present in the reaction zone is not critical except to the extent that the quantity of alkaline earth metal fluoride in the zone must be sufficient to produce a catalytic effect, i.e., a catalytic amount. As in most gas phase catalytic reactions, the reactor contains sufficient catalyst to insure contact of the reactant gases with the catalyst for the desired contact time. As stated above, while the alkaline earth metal fluoride may be used alone, many times it is preferred to employ a carrier. When a carrier is employed, it is preferred to use activated carbon as such.

Any of the commercial grade activated carbons may be employed in the process of this invention, e.g., Columbia JXC or CXC, or National Carbon JXC. Sizing of the carbon is usually in the range of 2 to 14 mesh. The alkaline earth metal fluoride, i.e., calcium fluoride, barium fluoride, magnesium fluoride or strontium fluoride, may be impregnated onto the carbon from an aqueous solution of a corresponding soluble salt of the metal, e.g., the chloride, the material is dried to remove water, and thereafter activated by treatment at about 400° C with a gaseous mixture of HF and nitrogen for about 20 hours thereby converting the soluble salt to the fluoride. It has been found desirable, when activated carbon is used as a carrier, that the alkaline earth metal fluoride be present thereon in an amount of between about 10 and 40 weight percent preferably 10 and 30 weight percent.

In the practice of this invention, the reactants ordinarily fed into the reactor are chlorine, sulfur dioxide, and hydrogen fluoride, preferably all substantially anhydrous. While not particularly preferred as starting material, sulfuryl chloride, $SO_2Cl_2$ may be used in place of sulfur dioxide and chlorine, and unless specifically otherwise indicated, sulfuryl chloride is to be considered the equivalent of sulfur dioxide and chlorine in the process of this invention. Of course, as indicated above, any $SO_2ClF$ recovered from the product gas, may be recycled to the feed gas mixture.

In customary practice using chlorine, sulfur dioxide, and hydrogen fluoride as starting materials, the quantity of chlorine fed in any given operation may be conviently used as the basis of determination of relative proportioning of chlorine, sulfur dioxide, and hydrogen fluoride reactants and rates of feed of the same. Stoichiometric requirements involve the use of one mole each of chlorine and sulfur dioxide and two moles of hydrogen fluoride. While any reasonably reactive proportion of chlorine, sulfur dioxide and hydrogen fluoride may be employed, in order to minimize difficulties in the product recovery system which might arise out of the presence of excess chlorine, an excess of chlorine over theory is not desirable. Hence, in most operations it is preferred to use at least one mole proportion of sulfur dioxide and at least two mole proportions of hydrogen fluoride per mole of chlorine. Although larger excesses of sulfur dioxide may be employed, ordinarily, a relatively smaller molecular excess of sulfur dioxide is desirable, and preferably sulfur dioxide is charged in an amount corresponding to about 1.05 to 1.5 moles per mole of chlorine. With respect to the quantity of hydrogen fluoride introduced into the reaction, while larger excesses of hydrogen fluoride may be used it is preferred to introduce into the process hydrogen fluoride in an amount substantially in a range of 2.05 to 3.0 moles per mole of chlorine. Incoming chlorine, sulfur dioxide and hydrogen fluoride may be metered into a mixing manifold and the resulting mixture charged into the reactor containing the catalyst.

Reaction zone temperatures are generally dependent on, among other things, the catalyst employed, and whether or not the catalyst is present on a carrier. For example, the use of an alkaline earth metal fluoride alone may require temperatures in excess of 300° C, although temperatures above 400° C, for extended periods, should be avoided in order to prevent reduction of catalyst longevity. In the preferred embodiment of this invention, that is, when an alkaline earth metal fluoride is impregnated onto activated carbon, the temperature in the reaction zone will be below 200° C. Generally, when, e.g., barium fluoride is impregnated onto activated carbon, the temperature in the reaction zone will be between about 140° to 190° C, preferably 150° to 180° C.

Another consideration involved in the practice of this invention is contact time. This element, as in many catalytic processes, is highly variable depending upon such factors as temperature, particular catalyst composition and size, type of apparatus, and overall size of a specific operation. For any particular operation with given equipment, catalyst, reaction feed, etc, determination of optimum contact time is well within the skill of the art.

When the catalytic activity of the alkaline earth metal fluoride is reduced to a point below that desired, usually as determined by the yield of product, regeneration may be accomplished by heating the deactivated catalyst, while it remains in the reactor, in the presence of HF. Generally, heating is started while HF is introduced at 3 to 5 grams per hour until the temperature reaches about 400° C. The flow of HF is maintained for about 12 to 20 hours, and thereafter, the mass is cooled down to 150° C (or reaction temperature if different), while maintaining a flow of HF or an inert gas, e.g., nitrogen, therethrough. The catalyst is then substantially fully regenerated for use in the process of the invention.

DESCRIPTION OF PREFERRED EMBODIMENTS

EXAMPLE I

A 2 inch by 16 inch Monel pipe reactor was equipped with a thermowell and heated in a tube furnace. The reactor was charged with 300 cc of Harshaw Ba 0201 Barium Fluoride ⅛ inch tablets which were dried at 300° C under nitrogen before use. Hydrogen fluoride, sulfur dioxide and chlorine were mixed in a gas manifold heated to about 120° C and the gaseous mixture was then introduced into the reactor. The feed rates of reactants were 0.25 mole of chlorine, 0.25 mole of sulfur dioxide and 0.6 mole of hydrogen fluoride per hour. Experiments were carried out at 200°, 250°, 300°, 350° and 400° C. Samples were obtained periodically by diverting the reactor effluent through a ½ inch × 8 inch tube filled with NaF tablets to remove HF and then run into an IR cell. At the lower temperatures small amounts of sulfuryl fluoride were formed but the amounts increased considerably with temperature. At 300° to 400° C considerable amounts of sulfuryl fluoride were formed.

EXAMPLE II

Example I was repeated with the product stream being collected in a dry ice trap after passing through a water scrubber. The product was then analysed by gas chromatography using a ⅛ inch × 4 foot Porapak Q column. Run conditions and yields based on area percent are reported in the following table:

TABLE I

| Catalyst Reaction Temperature | Reaction Time (Hours) | Percent Yield $SO_2F_2$ |
|---|---|---|
| 330–360° C | 5.5 | 40.2 |
| 350–375° C | 6 | 30.2 |
| 380–430° C | 6 | 25.7 |
| 350–370° C | 6 | 8.5* |

*Indicates catalyst deactivation.

EXAMPLE III

In this example a barium fluoride impregnated onto activated carbon was employed as the catalyst. Into a 1 liter suction flask equipped with a dropping funnel there was placed 720 ml of 8–10 mesh Columbia JXC activated carbon. A solution of 185 grams of barium chloride in 400 ml of water was added slowly while applying a vacuum of 25 mm. After the solution was all added, the flask was heated for 4 hours to remove some of the water. The contents were then transferred to an evaporating dish and the mixture was heated with some stirring to remove the remainder of the water. The product was then dried in a vacuum oven at 140° C.

175 ml of this catalyst was charged into a 1 inch × 26 inch stainless steel reactor mounted vertically in a tube furnace. The catalyst was activated by heating to 400° C while passing therethrough a mixture of nitrogen and hydrogen fluoride for 20 hours. The reactant gaseous mixture was introduced through the bottom of the reactor. The products were passed through a water scrubber, a wet ice trap and a sulfuric acid scrubber into dry ice traps. The temperature of the 10 inch catalyst bed varied as indicated, 0 inches indicating the bottom of bed and 10 inches indicating the top. Contact time was about 23 seconds for Runs 1 thru 9 (100 hours) after which contact time was lowered to 10 seconds and the reaction was continued for an additional 45 hours.

At this time the catalyst was reactivated by stopping the flow of $SO_2$ and $Cl_2$ and continuing the HF at 3-4 grams/hr while increasing the temperature of the catalyst bed. After 3 hours, the temperature reached 400° C. The bed was maintained at that temperature for 10 hours while the flow of HF was increased to 5 grams per hour and then decreased to 3 grams per hour for an additional 9 hours. The bed was allowed to cool down to 150° C while maintaining the flow of HF at 3 grams per hour and then Run No. 14 was started. Yields of sulfuryl fluoride were similar to newly treated catalyst for a period of 75 hours at a 23 second contact time. Run conditions and yields are reported in Table II:

TABLE II

| Run No. | Catalyst Temp. in ° C. at | | | | | Reaction Time (hours) | Moles per Hour | | HF | %Yield $SO_2F_2$ |
|---|---|---|---|---|---|---|---|---|---|---|
| | 0" | 2" | 5" | 8" | 10" | | $SO_2$ | $Cl_2$ | | |
| 1 | 148 | 157 | 164 | 175 | 184 | 5 | .18 | .17 | .4 | 81.8 |
| 2 | 152 | 157 | 170 | 182 | 181 | 17 | .18 | .17 | .4 | 92.1 |
| 3 | 152 | 156 | 169 | 180 | 179 | 7 | .18 | .17 | .4 | 95.0 |
| 4 | 152 | ** | ** | ** | 180 | 16 | .18 | .17 | .4 | 97.7 |
| 5 | 147 | 150 | 164 | 176 | 176 | 8 | .18 | .17 | .4 | 91.5 |
| 6 | 150 | 157 | 170 | 184 | 183 | 16 | .18 | .17 | .4 | 88.3 |
| 7 | 150 | 152 | 164 | 177 | 177 | 7 | .18 | .17 | .4 | 81.0 |
| 8 | 152 | 155 | 168 | 182 | 184 | 6 | .18 | .17 | .4 | 82.3 |
| 9 | 145 | 145 | 162 | 173 | 177 | 18 | .18 | .17 | .4 | 71.2 |
| 10 | 182 | 167 | 167 | 176 | 183 | 5 | .42 | .4 | .9 | 62.1 |
| 11 | 175 | 160 | 164 | 173 | 175 | 18 | .42 | .4 | .9 | 51.3 |
| 12 | 208 | 212 | 228 | 246 | 250 | 6 | .37 | .35 | .8 | 76.5 |
| 13 | 202 | 206 | 224 | 244 | 248 | 16 | .37 | .35 | .8 | 64.8 |
| 14 | 145 | 149 | 163 | 173 | 176 | 6 | .18 | .17 | .4 | 100 |
| 15 | 156 | 162 | 173 | 183 | 185 | 5 | .18 | .17 | .4 | 90.3 |
| 16 | 150 | ** | ** | ** | 179 | 16 | .18 | .17 | .4 | 94.8 |
| 17 | 148 | 149 | 165 | 175 | 181 | 8 | .18 | .17 | .4 | 95.9 |
| 18 | 151 | ** | ** | ** | 179 | 16 | .18 | .17 | .4 | 89.8 |
| 19 | 149 | 150 | 162 | 174 | 180 | 8 | .18 | .17 | .4 | 81.5 |
| 20 | 147 | ** | ** | ** | 177 | 16 | .18 | .17 | .4 | 67.8 |

**not measured

Table II indicates that sulfuryl fluoride may be produced in good yield, by employing a barium fluoride catalyst impregnated onto activated carbon, and by operating at a temperature of between about 150° C and about 180° C. These good yields are obtained over a relatively long period of time. Also, the results indicate that the catalyst can be regenerated with surprisingly good results, and remain active for a substantial period of time.

We claim:

1. A process for producing sulfuryl fluoride which comprises introducing a substantially anhydrous gaseous mixture of chlorine, sulfur dioxide and hydrogen fluoride into a reaction zone in which there is present an alkaline earth metal fluoride catalyst, maintaining the temperature in the reaction zone between about 125° C and 400° C, and recovering the sulfuryl fluoride produced.

2. A process according to claim 1 wherein the temperature of the reaction zone is maintained between 300° and 400° C.

3. Process according to claim 1 wherein the alkaline earth metal fluoride is present on a carrier.

4. A process according to claim 3 wherein the carrier is activated carbon.

5. A process according to claim 4 wherein the temperature in the reaction zone is maintained between 140° and 190° C.

6. A process according to claim 1 wherein the alkaline earth metal fluoride is barium fluoride.

7. A process according to claim 3 wherein the alkaline earth metal fluoride is barium fluoride.

8. A process for producing sulfuryl fluoride wich comprises introducing a substantially anhydrous gaseous mixture of chlorine, sulfur dioxide and hydrogen fluoride into a reaction zone in which there is present activated carbon impregnated with barium fluoride, maintaining the temperature in the reaction zone between about 140° and 190° C and recovering the sulfuryl fluoride thus produced.

9. A process according to claim 8 wherein the temperature of the reaction zone is maintained between about 150° C and 180° C.

* * * * *